(12) United States Patent
Deever

(10) Patent No.: US 8,605,221 B2
(45) Date of Patent: Dec. 10, 2013

(54) DETERMINING KEY VIDEO SNIPPETS USING SELECTION CRITERIA TO FORM A VIDEO SUMMARY

(75) Inventor: Aaron T. Deever, Pittsford, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 337 days.

(21) Appl. No.: 12/786,480

(22) Filed: May 25, 2010

(65) Prior Publication Data
US 2011/0293250 A1 Dec. 1, 2011

(51) Int. Cl.
*H04N 9/64* (2006.01)
*H04N 5/275* (2006.01)

(52) U.S. Cl.
CPC ..................... *H04N 5/275* (2013.01)
USPC ............ 348/590; 348/700; 386/239; 386/248; 382/190; 382/225

(58) Field of Classification Search
CPC ....................................................... H04N 5/275
USPC ......... 386/224, 240, 241, 278, 329, 343, 239, 386/248; 348/207.99, 231.2, 590, 700; 382/162, 168, 190, 225; 375/240.01, 375/240.08, 240.12, 240.13
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daly et al. | |
| 5,189,511 A | 2/1993 | Parulski et al. | |
| 5,493,335 A | 2/1996 | Parulski et al. | |
| 5,652,621 A | 7/1997 | Adams, Jr. et al. | |
| 5,668,597 A | 9/1997 | Parulski et al. | |
| 5,818,439 A | 10/1998 | Nagasaka | |
| 5,995,095 A | 11/1999 | Ratakonda | |
| 6,192,162 B1 | 2/2001 | Hamilton, Jr. et al. | |
| 6,292,218 B1 | 9/2001 | Parulski et al. | |

(Continued)

FOREIGN PATENT DOCUMENTS

| | | |
|---|---|---|
| EP | 1 657 923 | 5/2006 |
| EP | 2 063 635 | 5/2009 |
| WO | 2007/122541 | 11/2007 |

OTHER PUBLICATIONS

Zhang Tong: Intelligent keyframe extraction for video printing:, Proceedings of SPIE, The International Society for Optical Engineering SPIE, USA, vol. 5601, Jan. 1, 2004, pp. 25-35, XP009093166, ISSN: 0277-786X, DOI: 10.1117/12.572474.

(Continued)

*Primary Examiner* — Daquan Zhao
*Assistant Examiner* — Mishawn Dunn

(57) ABSTRACT

A method for forming a video summary for a digital video having a time sequence of video frames, comprising using a processor to perform the steps of: determining a set of key video frames for the digital video; ranking the key video frames responsive to a predefined criterion; forming key video snippets corresponding to one or more highest-ranked key video frames according to a predefined set of criteria, including a criterion which specifies the total time duration for the video summary and a criterion which specifies the minimum time duration for each of the key video snippets; assembling the key video snippets to form a video summary; and storing a representation of the video summary in a processor-accessible memory.

16 Claims, 12 Drawing Sheets

(56) References Cited

U.S. PATENT DOCUMENTS

| | | |
|---|---|---|
| 6,462,754 B1 | 10/2002 | Chakraborty et al. |
| 6,833,865 B1 | 12/2004 | Fuller et al. |
| 6,845,176 B1 * | 1/2005 | Sezan ............... 382/168 |
| 6,934,056 B2 | 8/2005 | Gindele et al. |
| 7,035,435 B2 | 4/2006 | Li et al. |
| 7,046,731 B2 | 5/2006 | Wu et al. |
| 7,055,168 B1 | 5/2006 | Errico et al. |
| 7,212,666 B2 * | 5/2007 | Zhang et al. ............ 382/162 |
| 7,403,224 B2 | 7/2008 | Fuller et al. |
| 7,409,144 B2 | 8/2008 | McGrath et al. |
| 7,424,204 B2 * | 9/2008 | Nakamura ............ 386/248 |
| 7,483,618 B1 | 1/2009 | Edwards et al. |
| 7,542,077 B2 | 6/2009 | Miki |
| 2004/0052505 A1 | 3/2004 | Ahmad et al. |
| 2005/0191729 A1 | 9/2005 | Kaczmarek et al. |
| 2005/0231601 A1 * | 10/2005 | Higuchi et al. ......... 348/207.99 |
| 2007/0182861 A1 | 8/2007 | Luo et al. |
| 2007/0183497 A1 | 8/2007 | Luo et al. |
| 2007/0201817 A1 * | 8/2007 | Peker ................. 386/68 |
| 2007/0237225 A1 | 10/2007 | Luo et al. |
| 2008/0043848 A1 | 2/2008 | Kuhn |
| 2009/0007202 A1 | 1/2009 | Williams et al. |
| 2009/0079847 A1 * | 3/2009 | Ohtsuka et al. ............ 348/231.2 |
| 2009/0157897 A1 * | 6/2009 | Echigo et al. ................. 709/232 |

OTHER PUBLICATIONS

Ma Y-F et al: "A Generic Framework of User Attention Model and its Application in Video summarization", IEE Transactions on Multimedia, IEEE Service Center, Piscataway, NJ, US, vol. 7, No. 5, Oct.1, 2005, p. 907-919, XP01113970, ISSN: 1520-9210, DOI: 10.1109/TMM.2005,854410.

Ma Y-F et al: "A User Attention Model for Video Summarization", Proceedings $10^{th}$ ACM International Conference on Mudltimedia. Juan-les-Pins, France, Dec. 1-6, 2002, vol. Conf. 10, Dec. 1, 2002, pp. 533-543, XP001175055; DOI: 10.1145/641007,641116, ISBN: 978-1-58113-620-3.

Divakaran A et al: "Video browsing system for personal video recorders" Proceedings of SPIE, The International Society for Optical Engineering SPIE, USA, vol. 4861, Jan. 1, 2002, pp. 22-25, XP009092815, ISSN: 0277-786X, DOI: 10.117/12.470201.

International Preliminary Report on Patentability for PCT/US2011/035808, issued Nov. 27, 2012.

* cited by examiner

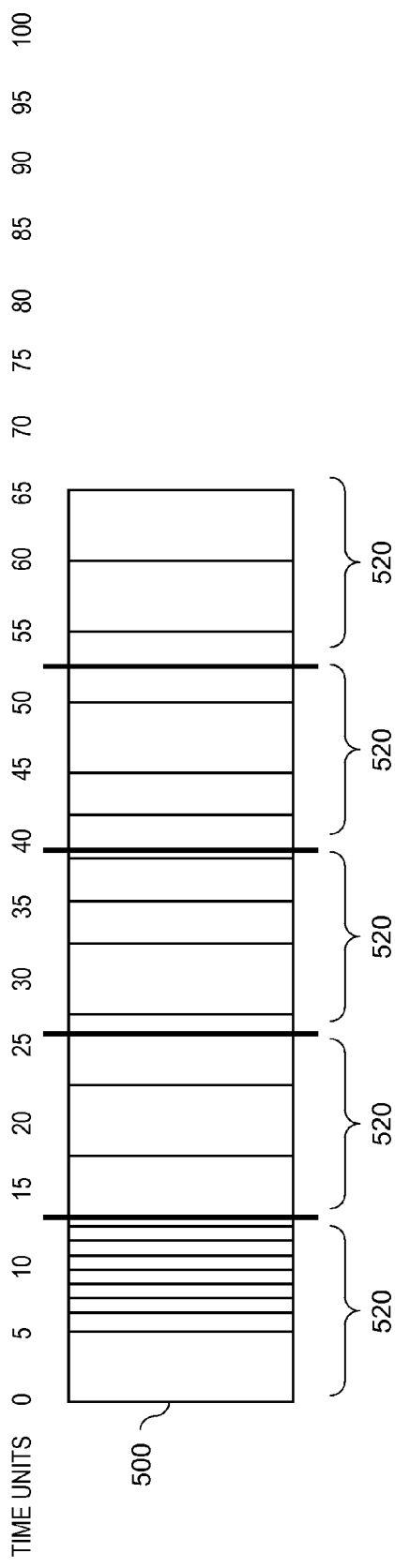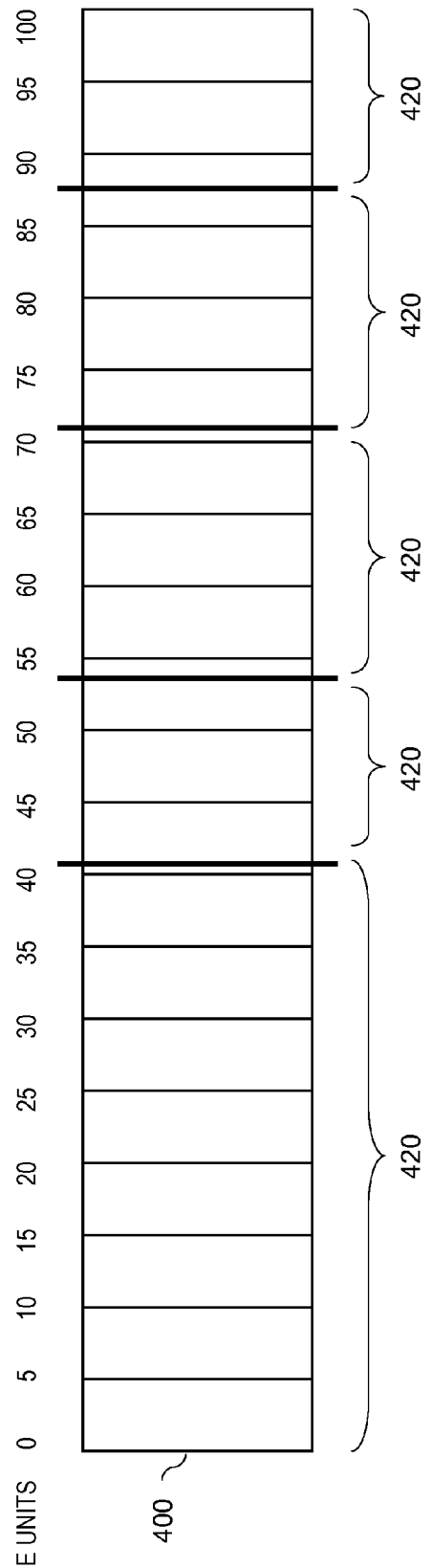

| 0 | 10 | 35 | 74 | 25 | 26 | 52 | 632 | 209 | 4 | 43 |
|---|---|---|---|---|---|---|---|---|---|---|
| 244 | 21 | 8 | 0 | 0 | 0 | 0 | 0 | 0 | 15 | 19 |
| 0 | 0 | 0 | 0 | 0 | 0 | 0 | 0 | 0 | 16 | 226 |
| 0 | 0 | 0 | 0 | 0 | 0 | 0 | 0 | 0 | 1 | 25 |

| KEY VIDEO FRAME NUMBER | CAMERA FIXATION REGION | FIXATION VALUE | INITIAL RANKING SCORE | INITIAL RANK | FINAL RANK |
|---|---|---|---|---|---|
| 1 | 3 | 0.4 | 80 | 2 | 4 |
| 2 | 6 | 0.2 | 70 | 3 | 2 |
| 3 | 3 | 0.4 | 90 | 1 | 1 |
| 4 | 2 | 0.1 | 60 | 4 | 3 |

FIG. 13

DETERMINING KEY VIDEO SNIPPETS USING SELECTION CRITERIA TO FORM A VIDEO SUMMARY

CROSS-REFERENCE TO RELATED APPLICATIONS

Reference is made to commonly assigned, co-pending U.S. Patent Application Publication No. 2011/0292288, entitled: "Method For Determining Key Video Frames", by Aaron T. Deever; to commonly assigned, co-pending U.S. Patent Application Publication No. 2011/0292229, entitled: "Ranking Key Video Frames Using Camera Fixation", by Aaron T. Deever; to commonly assigned, co-pending U.S. Patent Application Publication No. 2011/0293018, entitled: "Video Summary Method and System", by Aaron T. Deever; to commonly assigned, co-pending U.S. Patent Application Publication No. 2011/0292244, entitled: "Storing A Video Summary As Metadata", by Aaron T. Deever; and to commonly assigned, co-pending U.S. Patent Application Publication No. 2011/0292245, entitled: "Video Capture System Producing A Video Summary", by Aaron T. Deever, each of which are incorporated herein by reference.

FIELD OF THE INVENTION

This invention pertains to the field of digital video processing and more particularly to a method for selecting key video frames and forming video summaries.

BACKGROUND OF THE INVENTION

Many digital capture devices are capable of capturing video as well as still images. Managing digital video content, however, can be a difficult task. Videos are often represented visually with a thumbnail image of the first frame of the video. This may not provide much insight into the content of the video. Determining if a specific event is contained in a given video often requires viewing the entire video. For a lengthy video, a user may prefer to be able to get a quick summary of the video without having to view the video in its entirety.

Digital videos can also present practical problems from a sharing perspective. Many digital capture devices record video at 30 or 60 frames per second, at spatial resolutions as high as 1920×1080 pixels. Even when compressed, the amount of data generated can make it impractical to share even relatively short videos.

Video editing software can be used to manually summarize a video into a shorter version that can be shared more easily. Manual video editing can be a lengthy, laborious process, however, and many users are not interested in manual editing. Automatic video summarization algorithms exist as well. These solutions start with a captured video as input, and analyze the video to determine a video summary. Such algorithms are very complex, however, as it is necessary to decode the video to perform the analysis required to determine the video summary. Thus it is not possible on a digital capture device to immediately view a video summary corresponding to a just-captured video. This shortcoming makes it difficult to facilitate quick review and sharing of captured videos.

It would thus be desirable to provide systems and methods for computing a video summary in a digital capture device. In particular, it would be desirable to provide solutions that allow a video summary to be generated on a digital capture device with minimal delay at the completion of video capture.

SUMMARY OF THE INVENTION

The present invention represents a method for forming a video summary for a digital video having a time sequence of video frames, comprising using a processor to perform the steps of a) determining a set of key video frames for the digital video;

b) ranking the key video frames responsive to a predefined criterion;

c) forming key video snippets corresponding to one or more highest-ranked key video frames according to a predefined set of criteria, including a criterion which specifies the total time duration for the video summary and a criterion which specifies the minimum time duration for each of the key video snippets;

d) assembling the key video snippets to form a video summary; and e) storing a representation of the video summary in a processor-accessible memory.

This invention has the advantage that it provides a method for forming video summaries comprised of a sequence of the high importance key video snippets.

It has the additional advantage that the video summaries are provided according to a specified total time duration criterion and a minimum video snippet time duration criterion.

It has the further advantage that audio analysis is used to select start and end times for the video snippets that correspond to low levels of audio activity. Additional criteria are provided to discourage the formation of key video snippets having similar content and to avoid providing key video snippets that are separated by small time intervals.

BRIEF DESCRIPTION OF THE DRAWINGS

FIG. 6 illustrates the subdivision of the warped time representation into equal time intervals;

FIG. 7 illustrates the corresponding location of the time intervals of FIG. 6 relative to the original digital video sequence of FIG. 4;

FIG. 12 shows a numerical representation of the fixation location histogram given in FIG. 11;

FIG. 13 illustrates an example of a ranking process useful for determining highest-ranked key video frames;

DETAILED DESCRIPTION OF THE INVENTION

Figure 1:
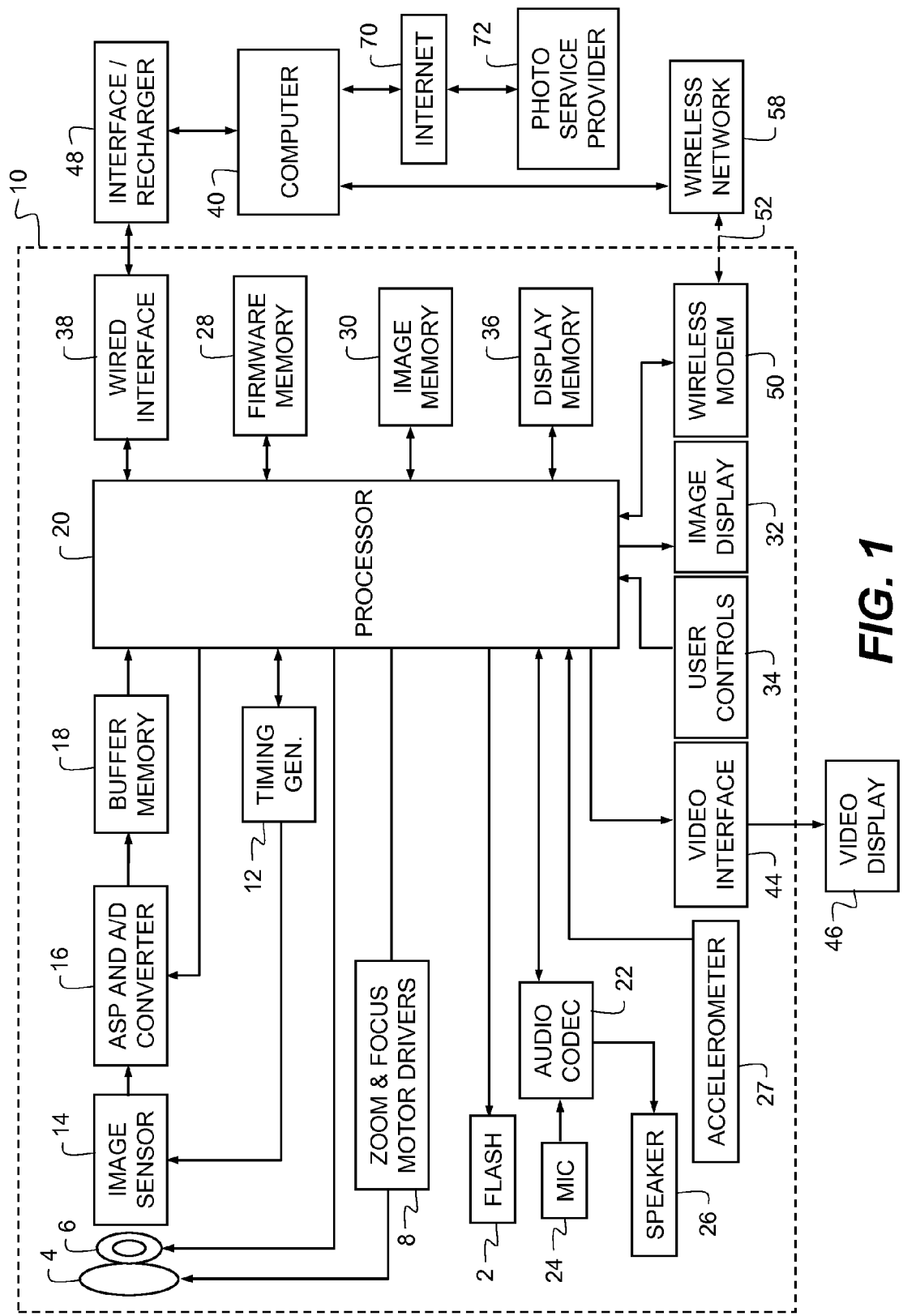
FIG. 1 is a high-level diagram showing the components of a system for forming a video summary according to an embodiment of the present invention.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 capable of capturing video images in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. In other embodiments, the digital camera 10 is a digital video camera that captures only motion video images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2005/191729, filed on Jul. 28, 2007 and titled "Image sensor with improved light sensitivity" to Compton and Hamilton, the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses a shutter button, which is one of the user controls 34, and the second mode (i.e., still image capture mode) is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

In some embodiments, the digital camera 10 also contains an accelerometer 27 which provides data related to the motion of the camera. Preferably, the accelerometer 27 detects both linear and rotational accelerations for each of three orthogonal directions (for a total of 6 dimensions of input).

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
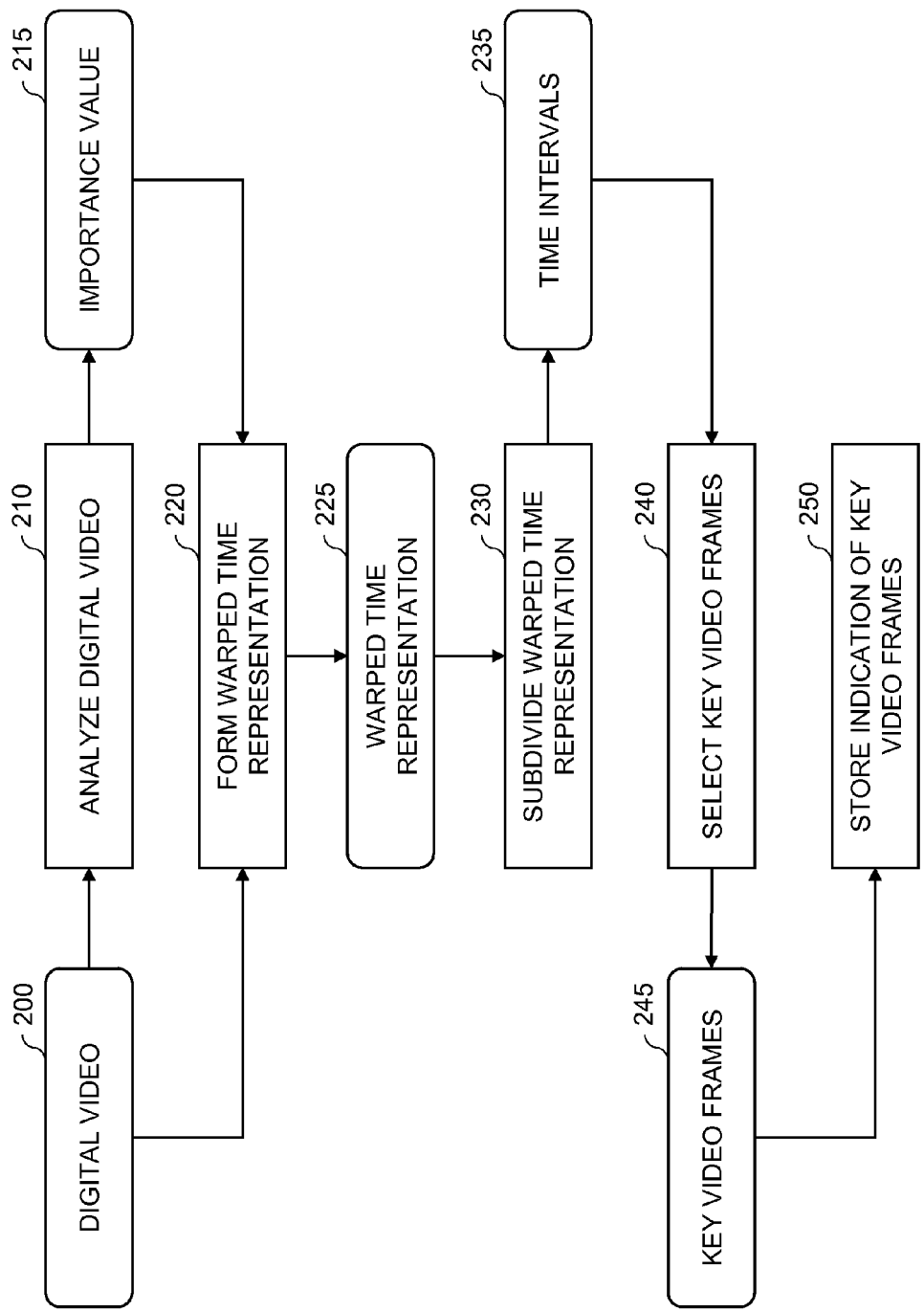
FIG. 2 is a flow diagram of a method for determining key video frames for a digital video sequence according to an embodiment of the present invention.

The present invention will now be described with reference to FIG. 2, which details a method for using a processor 20 to determine key video frames for a digital video sequence 200 having a time sequence of video frames. Initially, the digital video sequence 200 is analyzed using an analyze digital video step 210 to determine an importance value 215 as a function of time. A form warped time representation step 220 forms a warped time representation 225 for the digital video sequence 200 by temporal relocation of the video frames responsive to the importance value 215 as a function of time. A subdivide warped time representation step 230 subdivides the warped time representation 225 into a set of equal time intervals 235. A select key video frames step 240 selects a key video frame 245 for each time interval by analyzing the video frames within each time interval 235. A store indication of key video frames step 250 stores an indication of the key video frames 245 for the digital video sequence 200 in a processor-accessible memory.

The steps of FIG. 2 will now be described in greater detail. The analyze digital video step 210 determines an importance value 215 as a function of time. An importance value 215 is a quantity that represents the significance of the frames of the digital video sequence 200 as a function of time. Preferably, the importance value 215 is a numerical value that is defined for every frame of the digital video sequence 200. For example, video frames determined to be of high importance, such as video frames containing faces, can be assigned a relatively higher importance value 215. Video frames determined to be of low importance, such as video frames comprising a fast panning motion, can be assigned a relatively lower importance value 215.

Those skilled in the art will recognize that there are many features that can be calculated with respect to video frames in the digital video sequence 200 that can be used to determine the importance value 215 as a function of time. In a preferred embodiment of the present invention, the analyze digital video step 210 includes global motion analysis and local motion analysis. Global motion analysis determines global motion information that typically corresponds to motion of the capture device, while local motion analysis determines local motion information that corresponds to the movement of objects within the scene.

In some embodiments the global motion analysis is performed using a two-parameter global motion model that provides translational offset information (horizontal and vertical translation) as a function of time. In other embodiments, more complex global motion models can be used to provide additional information such as rotational information on three orthogonal axes and scale (zoom) information.

Local motion analysis is performed using local motion models that provide dense local motion information. In some embodiments, the local motion model provides translational motion values for every pixel as a function of time. Local motion models can also provide coarser motion estimates, for example providing a translational motion value for every 8×8 or 16×16 block of pixels. In a preferred embodiment, local motion information provides an indication of the degree of motion occurring in the center region of the video frame. This can be computed, for example, by counting the number of pixels in the center region of a video frame which are identified as being part of moving regions.

In some embodiments, the computation of the global and local motion information is performed after the digital video sequence 200 has been captured, compressed and stored in a processor accessible memory. This requires that the compressed digital video sequence be decompressed before it can be analyzed. In other embodiments, the global and local motion information are determined during the digital video capture process prior to the digital video sequence 200 being compressed. This mitigates the need to decompress the digital video sequence for purposes of performing the global and local motion analysis. In this case, the computed global and local motion information can be stored as metadata associated with the digital video sequence 200. The metadata can either be stored in the digital video file, or as a separate file associated with the stored digital video sequence. Such a method is described in commonly-assigned co-pending U.S. Patent Application Publication No. 2011/0293018, entitled "Video summary method and system", which is incorporated herein by reference.

Figure 3:
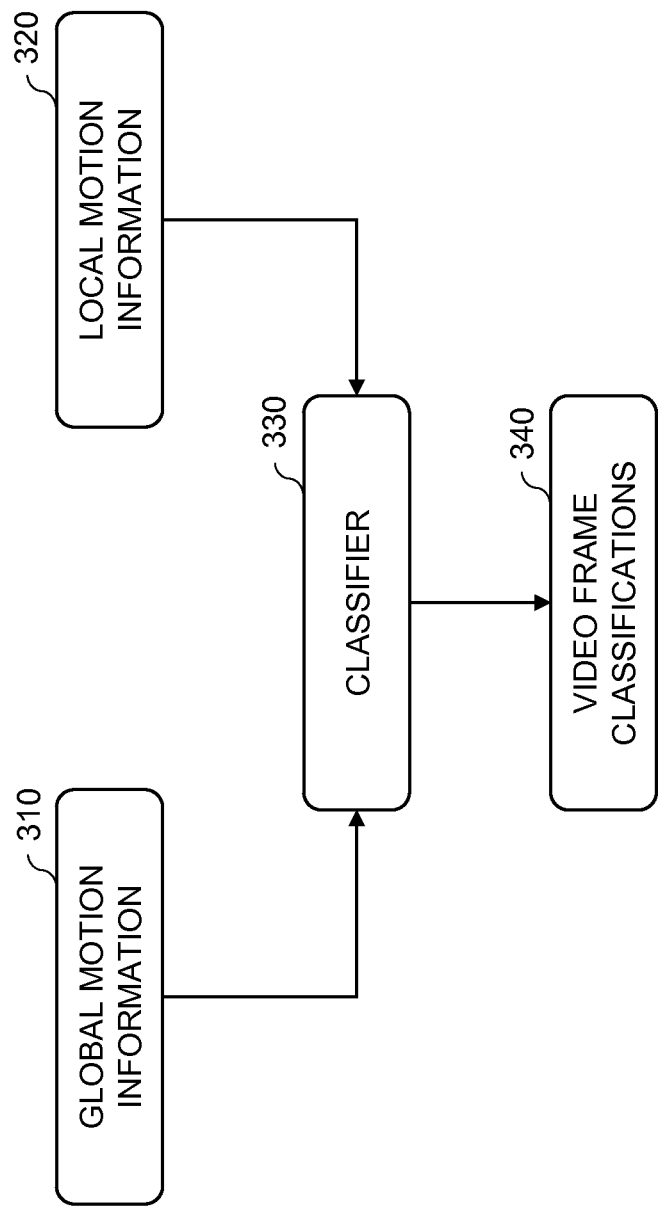
FIG. 3 is a flow diagram of a method for classifying video frames according to an embodiment of the present invention.

In a preferred embodiment, the analyze digital video step 210 includes the step of classifying a plurality of the video frames. FIG. 3 describes the classification process for a preferred embodiment of the present invention. Global motion information 310 and local motion information 320 determined by the global motion analysis and the local motion analysis, respectively, are inputs to a classifier 330, which determines video frame classifications 340 for a plurality of the video frames. In a preferred embodiment, video frame classifications 340 assigned for video frames include: zoom, fast pan, interesting and inactive.

The classifier 330 classifies a video frame as a zoom video frame whenever the camera is zooming in or zooming out while that frame is being captured. Zooming processes can be detected through digital image analysis using global motion models that include a scale parameter to detect zoom. Zooming processes can also be detected at capture time by recognizing signals sent to the zoom motor driver 8 to adjust the zoom lens 4.

The classifier 330 classifies a video frame as a fast pan video frame whenever the magnitude of global translational motion occurring during that video frame exceeds a threshold. Individual video frames corresponding to fast panning motions are generally very blurry and are therefore not good candidates for key video frames to represent a digital video sequence.

The classifier 330 classifies a video frame as an inactive video frame whenever the magnitude of the global translational motion and the magnitude of the zoom motion, as well as the magnitude of the local motion, are below specified thresholds. Such video frames are indicative of a relatively stationary capture device and a scene with relatively little object motion. A single key video frame is often sufficient to represent an inactive segment of a digital video sequence.

In the absence of additional classes, all remaining video frames can be classified as interesting video frames. The interesting video frames represent segments of the digital video sequence most likely to contain good candidates for key video frames to represent the digital video sequence.

In a preferred embodiment of the present invention, an importance value 215 (FIG. 2) is assigned for each video frame. Importance values 215 can be determined from the video frame classifications 340 by associating an appropriate importance value with each of the different video frame classifications 340. The table below illustrates example importance values 215 for each of the video frame classifications 340 described above:

TABLE 1

Video frame classification importance values

| Video Frame Classification | Importance Value |
|---|---|
| Zoom | 0.3 |
| Fast Pan | 0.2 |
| Inactive | 0.6 |
| Interesting | 1.0 |

Figure 4:
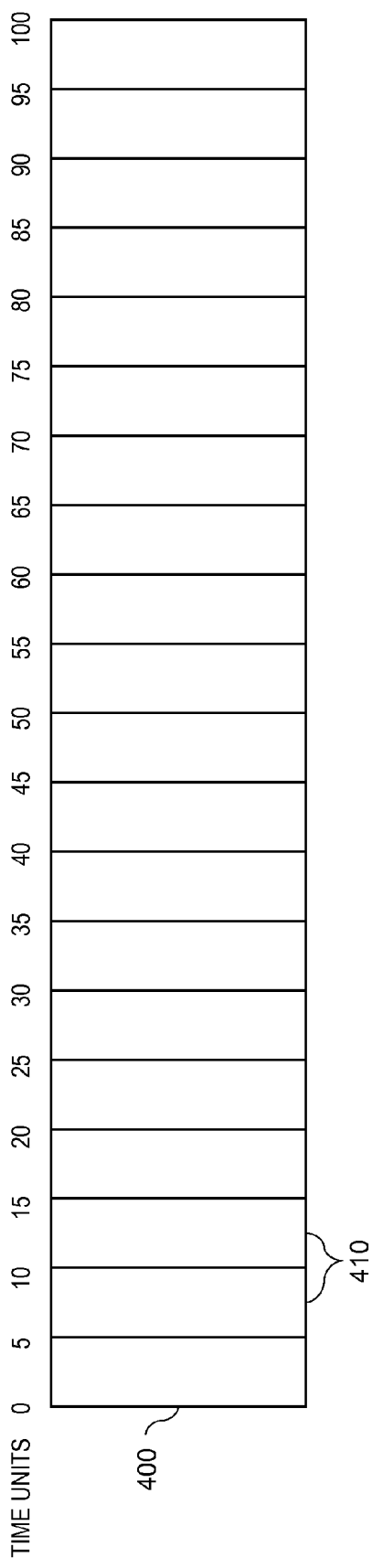
FIG. 4 illustrates a digital video sequence divided in a set of equal digital video intervals.
Figure 5:
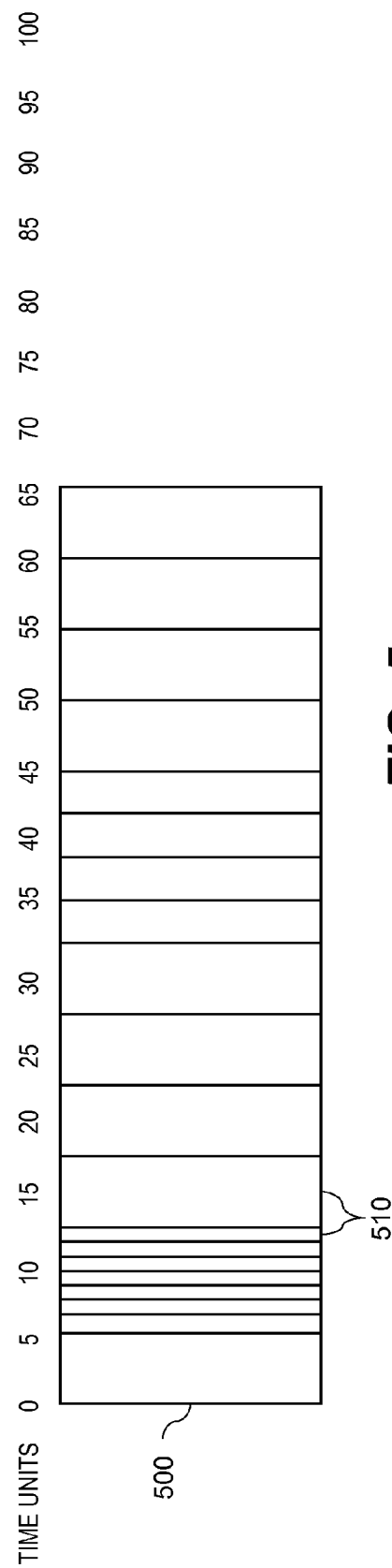
FIG. 5 illustrates a warped time representation of the digital video sequence shown in FIG. 4.

The form warped time representation step 220 (FIG. 2) forms a warped time representation 225 for the digital video sequence by temporal relocation of the video frames responsive to the importance value 215 as a function of time. FIGS. 4 and 5 illustrate this warping process according to one embodiment of the present invention. FIG. 4 illustrates a digital video sequence 400 beginning at time unit 0 and ending at time unit 100, divided into equal digital video intervals 410 that are each 5 time units long. The absolute value of each time unit is not important for the following discussion, but as an example, each time unit can represent 10 milliseconds, and each 5 time unit long piece of the digital video sequence can represent one video frame. In this case, each video frame is 50 milliseconds, such that the digital video sequence is captured at 20 video frames per second. In other embodiments, the digital video intervals 410 can include a plurality of video frames rather than a single video frame.

FIG. 5 represents the warped time representation 225 of this digital video sequence 200, wherein each digital video frame is temporally relocated responsive to the importance values 215 associated with the digital video frames based on their corresponding video frame classes. Treating each piece of the digital video sequence as a single video frame and using the importance values defined in Table 1, FIG. 5 illustrates a warped time representation 500 comprised of warped digital video intervals 510 for the digital video sequence 400. In this example, video frame 1 is classified as "interesting," video frames 2-8 are classified as "fast pan," video frames 9-12 are classified as "interesting," video frames 13-16 are classified as "inactive," and video frames 17-20 are classified as "interesting."

For a digital video interval 410 (video frame) of temporal extent of 5.0 time units and having a video frame class of "zoom" and a corresponding importance value of 0.3, a temporal extent of 5.0*0.3=1.5 time units is assigned to the warped digital video interval 510. Similarly, for a digital video interval 410 of temporal extent of 5.0 time units and having a video frame class of "fast pan" and a corresponding importance value of 0.2, a temporal extent of 5.0*0.2=1.0 time units is assigned to the warped digital video interval 510; for a digital video interval 410 of temporal extent of 5.0 time units and having a video frame class of "inactive" and a corresponding importance value of 0.6, a temporal extent of 5.0*0.6=3.0 time units is assigned to the warped digital video interval 510; and for a digital video interval 410 of temporal extent of 5.0 time units and having a video frame class of "interesting" and a corresponding importance value of 1.0, a temporal extent of 5.0*1.0=5.0 time units is assigned to the warped digital video interval 510.

In a preferred embodiment, the warped time representation 500 is formed by assigning shorter temporal extent to digital video intervals 410 in portions of the digital video having lower importance values 215, and assigning longer temporal extent to video frames in portions of the digital video having higher importance values 215.

The subdivide warped time representation step 230 (FIG. 2) subdivides the warped time representation 225 into a set of equal time intervals 235. FIG. 6 illustrates this step for the case in which the warped time representation 500 is subdivided into a set of 5 equal time intervals 520. Note that in the warped time representation, the absolute number of digital video frames (i.e., warped digital video intervals 510) contained in each equal time interval 520 will generally not be constant.

FIG. 7 illustrates the location of corresponding time intervals 420 relative to the original representation of the digital video sequence 400. In this example, it can be seen that the first time interval 420 contains more than 40% of the total number of digital video frames contained in the digital video sequence 400, while the second time interval 420 contains fewer than 15%.

The use of a warped time representation 225 (FIG. 2) has the advantage that it allows the selection of one key video frame from within each time interval in a manner such that the key video frames have breadth throughout the entire digital video sequence, while simultaneously being biased to favor regions of high importance value.

The number of time intervals 235 (FIG. 2) can be automatically determined, based on, for example, the overall temporal extent of the warped time representation of the digital video sequence. Alternatively, the number of time intervals can be user-specified.

The select key video frames step 240 (FIG. 2) selects a key video frame 245 for each time interval 235 by analyzing the video frames within each time interval 235. In a preferred embodiment of the present invention, this analysis includes assigning a selection score to a plurality of video frames within each time interval 235, wherein the selection score is a function of the global motion and the local motion. The video frame with the highest selection score within a time interval 235 can be selected as the key video frame 245 for that time interval 235.

Most methods for compressing digital video sequences involve encoding some video frames as independently-encoded video frames, and other video frames as predictive-encoded video frames. In some embodiments of the present invention, only independently-encoded video frames are considered as candidates for key video frames within each time interval 235, and selection scores are only computed for independently-encoded video frames. Independently-encoded video frames refer to video frames that are encoded without any reference to other video frames. Such video frames can be decoded without requiring any information from other video frames. In contrast, predictive-encoded video frames are encoded based on a prediction from one or more neighboring video frames. As such, a predictive-encoded video frame can not be decoded independently because it requires knowledge of one or more other video frames. In many video encoding schemes, independently-encoded video frames are encoded at high quality, specifically because they are used as a prediction for subsequent video frames, and a high quality prediction yields efficient encoding of the subsequent video frames. Thus independently-encoded frames are preferable candidates for key video frames 245, both because they are typically of high image quality and also because they can be decoded quickly from the compressed digital video sequence without needing to decode any additional video frames.

The selection score for a video frame can be a function of several different inputs, including global translational motion, zoom, local motion, and proximity to the previous key video frame. In a preferred embodiment, video frames with corresponding high global translational motion magnitude are assigned relatively low selection score because high levels of global motion typically produces motion blur in the video frame. Likewise, video frames that follow the conclusion of a zoom sequence are assigned relatively high selection scores based on the assumption that the user has intentionally performed a zoom to focus attention on a particular region of interest. Therefore, video frames shortly after the zoom concludes (allowing some time for the capture device to refocus) are likely to be of high importance and are good candidates to be considered for key video frames 245. Video frames with very low levels of object motion are assigned relatively low selection scores based on the assumption that video frames of interest likely contain some object activity. Video frames in close temporal proximity to other key video frames 245 are assigned lower selection scores based on the assumption that the captured video has high temporal correlation, and therefore video frames in close temporal proximity are more likely to contain redundant information. In embodiments where key video frames are selected serially for each time interval, temporal proximity can be measured with respect to previous key video frames. For embodiments where key video frames are selected in a jointly optimized manner that considers the selection of all key video frames simultaneously, temporal proximity can be measured with respect to both temporally previous and subsequent key video frames.

In some embodiments, the selection score for a video frame comprises multiple components and is given by the following equation:

$$S(n) = GM(n) + LM(n) + Z(n) + P(n) \qquad (1)$$

where $S(n)$ is the selection score, $GM(n)$ is a global motion term, $LM(n)$ is a local motion term, $Z(n)$ is a zoom term, $P(n)$ is a proximity term, and n is the video frame. In this equation, the individual terms of the selection score can each vary from a value of 0 to a value of 1, depending on the characteristics of the video frame.

The global motion term (GM) can be computed using any method known in the art. In some embodiments, the global motion term has a value of 0 for all video frame global motion magnitude values exceeding a threshold, $T_{GM}$, a value of 1 for a video frame global motion magnitude value of 0, and a value that decreases linearly from 1 to 0 for video frame global motion magnitude values between 0 and $T_{GM}$:

$$GM(n) = \begin{cases} 1 - x_{GM}(n)/T_{GM}; & x_{GM}(n) \le T_{GM} \\ 0; & x_{GM}(n) > T_{GM} \end{cases} \qquad (2)$$

where $x_{GM}(n)$ is the magnitude of the global motion vector for video frame n.

Alternatively, the value of the global motion term can be decreased from 1 to 0 in a non-linear fashion, such as according to a cosine function:

$$GM(n) = \begin{cases} \cos\left(\dfrac{\pi x_{GM}(n)}{2T_{GM}}\right); & x_{GM}(n) \le T_{GM} \\ 0; & x_{GM}(n) > T_{GM} \end{cases} \qquad (3)$$

In this example, the cosine function penalizes global motion more slowly at small magnitudes than a linear function.

The local motion term (LM) can be computed using any method known in the art. In some embodiments, local motion is measured as a function of a difference value computed between two video frames after accounting for global motion. For example, the difference value can be computed by shifting one of the video frames using the global motion vector, computing pixel differences between the overlapping pixels of the sifted video frames, and then computing the average pixel difference to provide a video frame local motion value. A greater video frame local motion value is generally suggestive of a greater amount of local motion, although other situations, such as changes in lighting, can also cause large differences between video frames.

In a preferred embodiment, the LM term is biased to preferentially select video frames having moderate levels of local motion. For example, a function can be used where the LM term has a value of 1 for a video frame local motion value at the mean value of all video frame local motion value within a temporal interval. As local motion gets smaller, the LM value decreases linearly to a value of 0.9 at a video frame local motion value of 0. As local motion increases, the LM value decreases linearly to a value of 0.8 at the maximum video frame local motion value in the temporal interval. In equation form, this can be expressed as:

$$LM(n) = \begin{cases} 0.9 + 0.1(x_{LM}(n)/\overline{x_{LM}}); & x_{LM}(n) \le \overline{x_{LM}} \\ 1.0 - 0.2\left(\dfrac{x_{LM}(n) - \overline{x_{LM}}}{x_{LM,max} - \overline{x_{LM}}}\right); & \overline{x_{LM}} < x_{LM}(n) > x_{LM,max} \end{cases} \quad (4)$$

where $x_{LM}(n)$ is the video frame local motion value for video frame n; $\overline{x_{LM}}$ is the mean value of all video frame local motion values for the video frames within the temporal interval; and $x_{LM,max}$ is the maximum video frame local motion value for all of the video frames within the temporal interval.

In alternate embodiments, the local motion term can be determined by computing local motion vectors between corresponding pixels in two video frames after accounting for global motion. The average magnitude of the local motion vectors can then be determined for each video frame and used as the video frame local motion values.

The zoom term (Z) can be computed using any method known in the art. In some embodiments, the zoom term has a value of 0 for video frames where a zoom action is in progress or has just completed (and the device has not had enough time to refocus yet), the zoom term has a value of 1 for two seconds immediately following a zoom action (after allowing time for the device to refocus), and the zoom term has a value of 0.5 for all other video frames.

The proximity term (P) can be computed using any method known in the art. In some embodiments, the proximity term has a value of 1 whenever a video frame is at least two seconds separated from the previous key video frame, and has a value that linearly decreases to 0 as the distance from the previous key video frame decreases to 0.

Those skilled in the art will recognize that the description above for selecting key video frames 245 by determining selection scores responsive to global motion and local motion features represents just one possible embodiment. Key video frames 245 can be selected in accordance with the present invention using any other method known in the art to select a key video frame 245 from within a time interval 235.

The store indication of key video frames step 250 stores an indication of the key video frames 245 in a processor-accessible memory. In some embodiments of the present invention, the key video frames 245 can be extracted as individual video frames. The individual video frames can then be compressed and stored within individual digital image files, such as well-known Exif-JPEG image files. An advantage of storing the key video frames as separate digital image files is that they are immediately accessible by any standard image reader.

In other embodiments of the present invention, the key video frames can be indicated by storing metadata associated with the digital video sequence 200. The metadata can be a list of video frames that have been identified to be key video frames 245. A "smart" video reader can interpret the metadata associated with the digital video and thereby extract the key video frames 245. An advantage of storing an indication of the key video frames 245 as metadata comprising a list of frames is that the only additional memory required to indicate the key video frames is the list of frames metadata, which requires a relatively small amount of memory.

In other embodiments of the present invention, the key video frames can be indicated by storing video frame thumbnail images as metadata associated with the digital video. The video frame thumbnail images are low resolution versions of the key video frames. An advantage of storing the key video frames as video frame thumbnail images associated with the digital video is that the key video frames can be extracted from the metadata more quickly than they can be extracted from the digital video.

Figure 8:
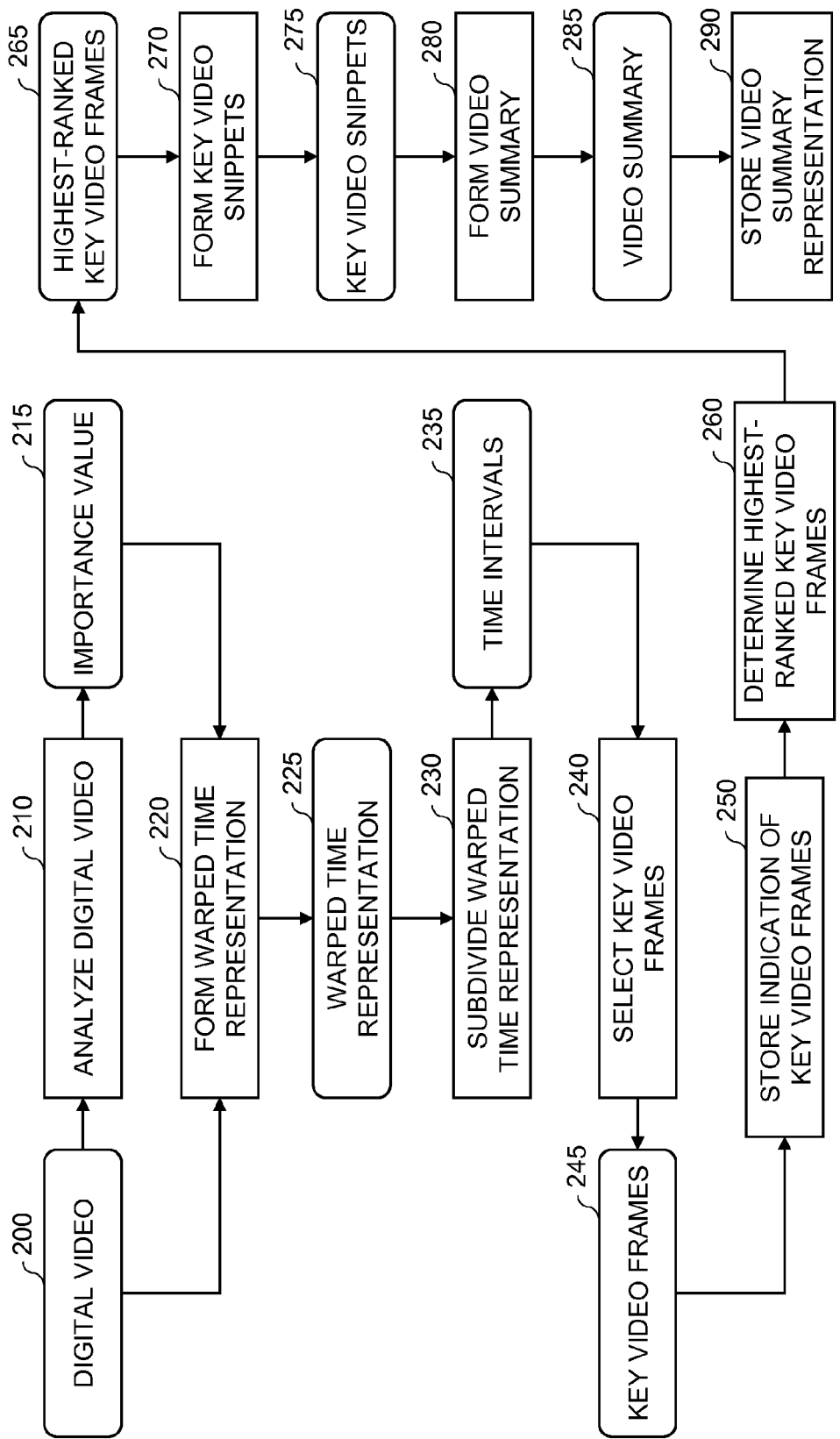
FIG. 8 is a flow diagram of a method for forming a video summary according to an embodiment of the present invention.

In some embodiments of the present invention, the method for determining key video frames represents one portion of a process for forming a video summary. FIG. 8 illustrates the steps for a method of forming a video summary according to one embodiment of the present invention. The analyze digital video step 210, the form warped time representation step 220, the subdivide warped time representation step 230, the select key video frames step 240 and the store indication of key video frames step 250 are performed as described previously with respect to FIG. 2. Subsequently, a determine highest-ranked key video frames step 260 ranks the key video frames 245 according to a specified criterion to determine a set of highest-ranked key video frames 265. A form key video snippets step 270 forms key video snippets 275 corresponding to the highest-ranked key video frames 265. A form video summary step 280 assembles the key video snippets 275 to form a video summary 285. A store video summary representation step 290 stores a representation of the video summary 285 in a processor-accessible memory.

Methods associated with the determine highest-ranked key video frames 260, form key video snippets step 270 and form video summary step 280 are described in greater detail below. The store video summary representation step 290 can use any method known in the art, such as those described in commonly assigned, co-pending U.S. Patent Application Publication No. 2011/0293018, entitled "Video summary method and system," which is incorporated herein by reference. One of these methods includes decompressing at least part of the stored digital video to extract video frames corresponding to the video summary, and compressing the extracted video frames to form a compressed video summary, which is then stored in a processor-accessible memory. Another of these methods includes generating metadata providing an indication of the video frames in the digital video sequence corresponding to the video summary, and wherein the metadata is stored in association with the stored digital video. Optionally, indications of various transition effects that can be used to transition between the key video snippets can also be stored as metadata associated with the digital video sequence.

Figure 9:
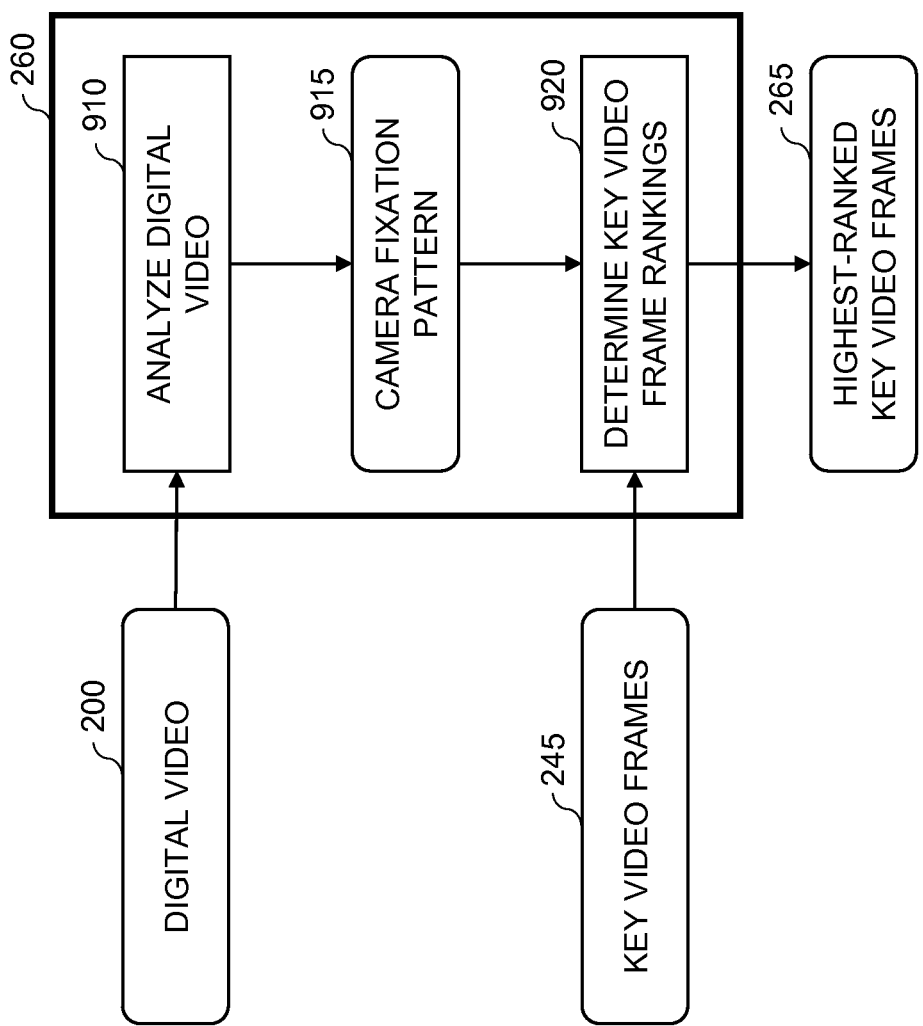
FIG. 9 is a flow diagram of a method for determining highest-ranked key video frames according to an embodiment of the present invention.

FIG. 9 illustrates additional details for the determine highest-ranked key video frames step 260 according to the one embodiment of the present invention. An analyze digital video step 910 analyzes the digital video to determine a camera fixation pattern 915. A rank key video frames step 920 determines the highest-ranked key video frames 265 for the digital video responsive to the camera fixation pattern 915.

The analyze digital video step 910 analyzes the digital video to determine the camera fixation pattern 915. The camera fixation pattern 915 represents the region of the image scene being captured as a function of time throughout the video capture process. In a preferred embodiment, the camera fixation pattern 915 is determined by analyzing the global camera motion. A stationary camera views the same portion of the image scene at all times, and has a camera fixation pattern 915 represented as a single point. On the other hand, the camera fixation pattern 915 for a moving camera will correspond to a motion trace representing the motion of the camera.

Figure 10:
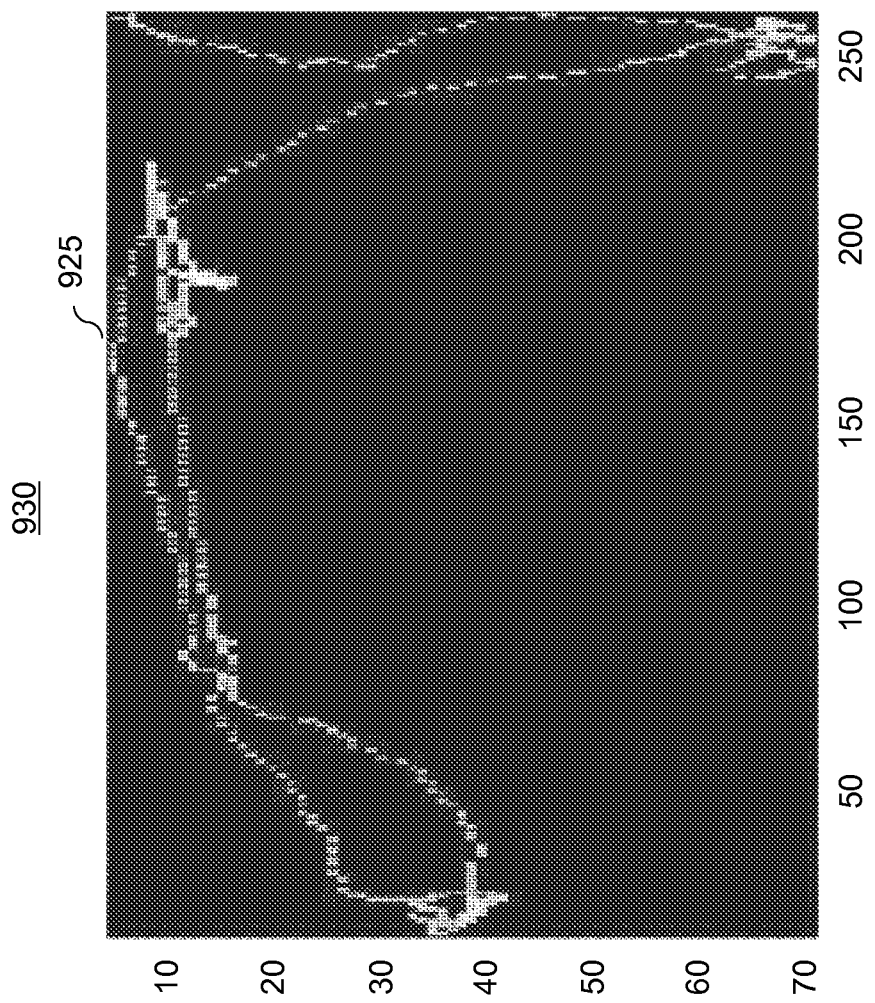
FIGS. 10 and 11 illustrate fixation location histograms.

FIG. 10 illustrates a fixation location histogram 930 representing a camera fixation pattern 915 (FIG. 9) for a digital video sequence 200 that includes some panning motions. A motion trace 925 is determined by analyzing the global translational motion of the video capture. The video capture process begins with the motion trace starting at an arbitrary location. For example, the video capture can be defined to begin at the origin (0,0) on a two-dimensional plane. (In the example given in FIG. 10, the video capture begins at the horizontal axis value of approximately 200, and the vertical axis value of approximately 10.) Global translational motion is then characterized by determining pixel offsets between consecutive video frames. The motion trace 925 is determined by tracing cumulative pixel offsets throughout the entire video capture.

In some embodiments, the motion trace 925 is represented using a histogram of camera fixation locations. The histogram bin for a particular camera fixation location is incremented by one for each video frame which is fixated at that camera fixation location. The camera fixation histogram 930 in FIG. 10 is a representation of such a histogram of camera fixation locations. Higher image intensity values at a particular location are an indication that a greater number of video frames were fixated at a given location. It can be seen that the camera was panned both vertically and horizontally during the capture process, and that there were some intervals where the camera fixation was held relatively constant.

In some embodiments of the present invention, the camera fixation pattern is spatially quantized into pixel regions. The quantization factor used in FIG. 10 was 10 pixels. That is to say that each bin in the histogram (each offset of one unit vertically or horizontally in FIG. 10) has a width of 10 pixels. For each global translational motion of 10 pixels in a given direction, the fixation position moves in that direction to the next bin in the histogram.

Figure 11:
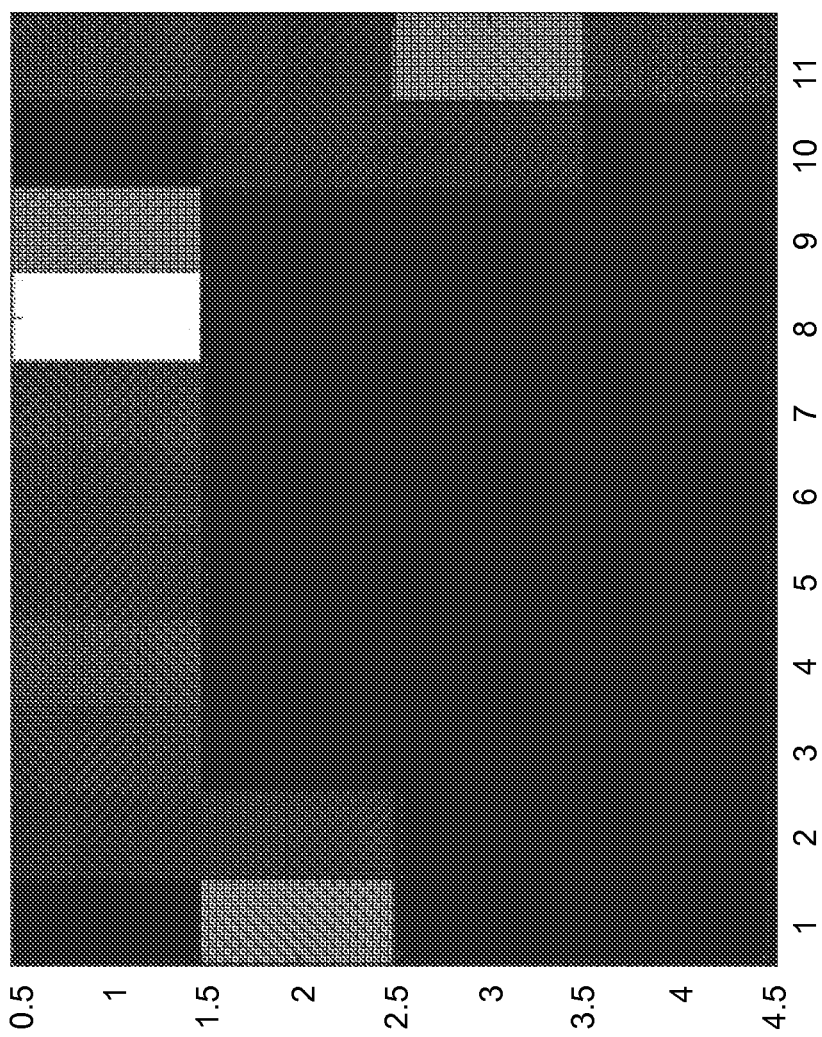

By increasing the quantization factor, the camera fixation histogram can be reduced to a smaller number of bins. FIG. 11 illustrates a fixation location histogram 940 corresponding to the same video capture as in FIG. 10 for which a quantization factor of 240 is used. This reduces the total number of histogram bins required to represent the fixation pattern. Additionally, it gives a more concentrated representation of the regions of fixation that will be less effected by camera shake and subtle movements that can change the histogram bin for small quantization factors. From examination of FIG. 11, it can be seen that there are four main camera fixation regions during the course of the digital video sequence.

FIG. 12 is a numerical representation of the fixation location histogram 940 given in FIG. 11. The numerical values indicate the number of video frames corresponding to a given bin in the fixation location histogram 940 throughout the video capture. The four main camera fixation regions all have greater than 200 video frames fixated on that region, while the remaining transitory regions all have fewer than 100 video frames each. In a preferred embodiment of the present invention, each region of the camera fixation pattern has an associated fixation value that is a function of the number of video frames in that region.

In the numerical representation of FIG. 12, the histogram value is given as an absolute number of video frames in each region. Alternatively, the histogram values can be scaled by a scale factor. For example, the histogram values can be normalized by the total number of video frames in the video capture.

In general, a region of the image scene that the camera fixates on is suggestive of a region of interest in the video capture. Thus, video frames corresponding to regions of high fixation are good candidates for key video frames.

In a preferred embodiment of the present invention, the camera fixation pattern is determined by global motion analysis as was described with respect to FIGS. 10-12. In alternate embodiments, the camera fixation pattern can also account for zoom. One method for handling zoom is by defining a three-dimensional motion trace, where two axes of the motion trace correspond to global translational motion (horizontal and vertical), and the third axis of the motion trace corresponds to zoom magnification. In other embodiments, the camera fixation pattern can also account for camera rotation.

In some embodiments, the global motion information is determined by analyzing data from an accelerometer 27 (FIG. 1). The accelerometer data can be converted to translational motion in units of pixels. In other embodiments of the present invention, the global motion information is determined using digital motion estimation. Those skilled in the art will recognize that there are many well-known methods for computing a global translational motion estimate between a pair of digital images.

Preferably, the quantization factor used in determining the camera fixation pattern histogram is a function of the resolution of the video capture. In one representative embodiment, the quantization factor is equal to one half of the resolution of a video frame. For a VGA video having 640 columns and 480 rows, this corresponds to a quantization factor of 320 in the horizontal direction and 240 in the vertical direction.

The motion traces illustrated in FIGS. 10 and 11 contain no temporal information. That is to say, while there is an indication of the overall camera fixation regions throughout the video capture, there is no indication of when in the video capture process they occur. In some embodiments of the present invention, the temporal information is retained and the motion trace indicates the camera fixation location as a function of time.

Returning to a discussion of FIG. 9, the key video frames 245 are preferably determined as described previously with respect to FIG. 2. Alternately, the key video frames 245 can be determined using any method known in the art. The rank key video frames step 920 ranks the key video frames 245 responsive to the camera fixation pattern 915. In a preferred embodiment, a corresponding camera fixation pattern region is determined for each key video frame. The camera fixation pattern region for a particular key video frame can be determined based on the location of the global translational motion trace at the capture time of the particular key video frame. A corresponding fixation value is then determined from the fixation location histogram for the digital video sequence for each key video frame. Preferably, the key video frames are initially ranked by fixation value. The key video frame with the highest fixation value is the highest initially ranked key video frame.

Additional ranking measures can also be used to rank the key video frames. In some embodiments of the present invention these additional ranking measures operate in conjunction with the fixation value to provide the initial ranking. In other embodiments of the present invention, the additional ranking measures are secondary ranking measures, and are used to break ties among all key video frames having equivalent fixation values. One example of an additional ranking measure for ranking key video frames is the selection score assigned to each frame as described previously with regards to the select key video frames step 240 in FIG. 2.

In a preferred embodiment of the present invention, the ranking of the key video frames is determined iteratively. In a first iteration, the highest ranking key video frame is determined. This can be determined by selecting the key video frame having the highest ranking based on fixation value and additional ranking measures.

After the highest-ranked key video frame is selected, each subsequent iteration involves re-ranking the remaining key video frames, and selecting the highest-ranked remaining key video frame. In a preferred embodiment of the present invention, after the highest ranking key video frame is determined, the key video frames are subsequently rank-adjusted by redundancy. Redundancy corresponds to multiple key video frames corresponding to a single fixation region. In order to rank the key video frames so that all different regions of fixation are represented in the ranked key video frame list before a single fixation region is represented multiple times, the key video frames are re-ranked at each iteration to favor regions that have not yet been represented in the ranked key video frame list.

FIG. 13 illustrates an example of this ranking and re-ranking process. Four key video frames are selected to represent a particular digital video sequence. Key video frame 1 corresponds to camera fixation region 3, which has a corresponding fixation value of 0.4. Key video frame 1 also has an initial ranking score of 80, based on the fixation value as well as an additional scoring measure. Similarly, key video frame 2 has a corresponding camera fixation region 6, fixation value 0.2, and initial ranking score of 70. Key video frame 3 has a corresponding camera fixation region of 3, fixation value of 0.4, and initial ranking score of 90. Key video frame 4 has a corresponding camera fixation region of 2, fixation value of 0.1, and initial ranking score of 60.

The initial ranking of the key video frames, based on the initial ranking score, from highest to lowest, is key video frame 3, key video frame 1, key video frame 2, and key video frame 4. Key video frame 3 is selected in the first iteration of the final ranking as the highest-ranked key video frame. Subsequently, the remaining key video frames are re-ranked to favor those key video frames from camera fixation regions other than camera fixation region 3. Consequently, key video frame 2 is selected in the second iteration of the final ranking. Key video frame 1 is only selected in the ranking process after all other fixation regions are represented, and as a result becomes the final ranked key video frame.

Returning to a discussion of FIG. 8, the form key video snippets step 270 forms key video snippets 275 corresponding to one or more highest-ranked key video frames 265. Generally, the form key video snippets step 270 forms the key video snippets 275 according to a predefined set of criteria, including a criterion which specifies the total time duration for the video summary and a criterion which specifies the minimum time duration for each of the key video snippets.

The highest-ranked key video frames 265 act as foundations from which the key video snippets 275, and ultimately the video summary 285, are built. The number of highest-ranked key video frames 265 that are selected to form the key video snippets 275 will generally depend on the total time duration of the video summary and the minimum time duration of the key video snippets. In some embodiments, a key video snippet 275 is centered around each of the selected highest-ranked key video frames 265.

In other embodiments of the present invention, the start and end time of each key video snippet is responsive to other criteria. For example, the digital video sequence can be analyzed to determine an importance value as a function of time, and the start and end times for a key video snippet can be determined responsive to a criterion which encourages the inclusion of video frames having high importance values. Analyzing the digital video to determine an importance value as a function of time can be performed as described with respect to the analyze digital video step 210 of FIG. 2. The importance value can favor, for example, the inclusion of interesting frames rather than inactive or fast pan frames. The start and end points of each key video snippet can be adjusted to be responsive to this criterion while simultaneously satisfying constraints on the total duration for the video summary and the minimum duration of each key video snippet.

In some embodiments of the present invention, the digital video is analyzed to determine a level of audio activity as a function of time. In this case, the start and end times for a key video snippet 275 can be determined responsive to a criterion which encourages selecting start and end times corresponding to low levels of audio activity. This minimizes the likelihood that a key video snippet either begins or ends with clipped speech. In most cases, it is desirable that the key video snippets contain complete speaking segments, and do not cut off a speaker in the middle of a sentence. Those skilled in the art will recognize that techniques for analyzing audio to detect speech are well-known in the art.

In some embodiments of the present invention, the key video snippets are formed according to a criterion which discourages the formation of key video snippets that have similar content. One method for discouraging the formation of key video snippets having similar content is by restricting the number of highest-ranked key video frames used to form key video snippets to only those having unique camera fixation regions. In the case that this number is smaller than would otherwise be chosen, the time duration of each individual key video snippet can be lengthened to satisfy the overall video summary time duration criterion.

In some embodiments of the present invention, key video snippets 275 corresponding to the highest-ranked key video frames 265 that are separated by time intervals less than a specified threshold are merged to form a single key video snippet. Merging of key video snippets can prevent the case that the end of one key video snippet overlaps the beginning of the next key video snippet, or are separated by only a short time duration. A video summary containing such transitions would tend to be confusing to a viewer. A visually preferable video summary contains a single merged key video snippet that eliminates the transition between the two original key video snippets.

Many digital video compression algorithms break a digital video sequence into groups of video frames for encoding purposes. For example, an encoding group of video frames may include one independently-encoded video frame (i.e., an "I" frame) and a plurality of predictive-encoded video frames (i.e., "P" frames), where each "P" frame is predicted from the previous frame. A particular encoding group of video frames ends and a new encoding group of video frames begins when the next "I" frame is encountered. In such a compression scheme, "I" frames offer access points into the compressed digital video sequence, wherein frames can be extracted starting at an "I" frame. In particular, entire encoding groups of video frames can be extracted from a compressed digital video sequence and transcoded into a video summary only requiring decoding of header information indicating the location of and number of compressed bytes comprising the encoding group of video frames. Thus it can be advantageous when forming a video summary 285 to impose a constraint that the starting frame of each key video snippet 275 is an "I" frame, and to require that the key video snippet 275 contains an exact number of encoding groups of video frames. These constraints enable the generation of the video summary 285 with minimal decompression of the original compressed digital video sequence.

In some embodiments of the present invention, the total time duration for the video summary is automatically determined. It can be determined responsive to the time duration of the original video, or the time duration of the warped time representation of the digital video. In other embodiments of the present invention, the total time duration of the video summary is user-specified. For example, a user may have a specific desired video summary length in mind. The number and duration of the key video snippets 275 can then be determined responsive to the total time duration of the video summary.

Figure 14:
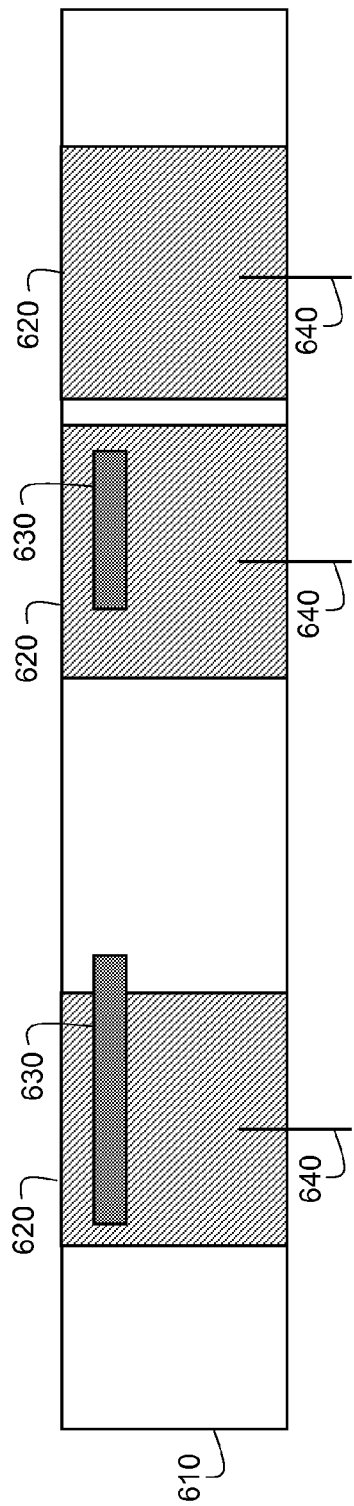
FIG. 14 illustrates the formation of key video snippets according to one embodiment.

FIG. 14 illustrates an example of the formation of key video snippets according to one embodiment. In this case, the key video snippets are formed such that they are of equal time duration and are centered around a set of corresponding highest-ranked key video frames. In this embodiment, a digital video sequence 610 is analyzed and three highest-ranked key video frames 640 are selected. A key video snippet 620 is formed corresponding to each highest-ranked key video frame 640. Speaking segments 630 are indicated within the digital video sequence 610. This process for determine key video snippets 620 has the drawback that the first key video snippet 620 cuts off a speaking segment 630 before it is finished. The determined key video snippets 620 also have the drawback that the second and third key video snippets have a short time duration between them.

Figure 15:
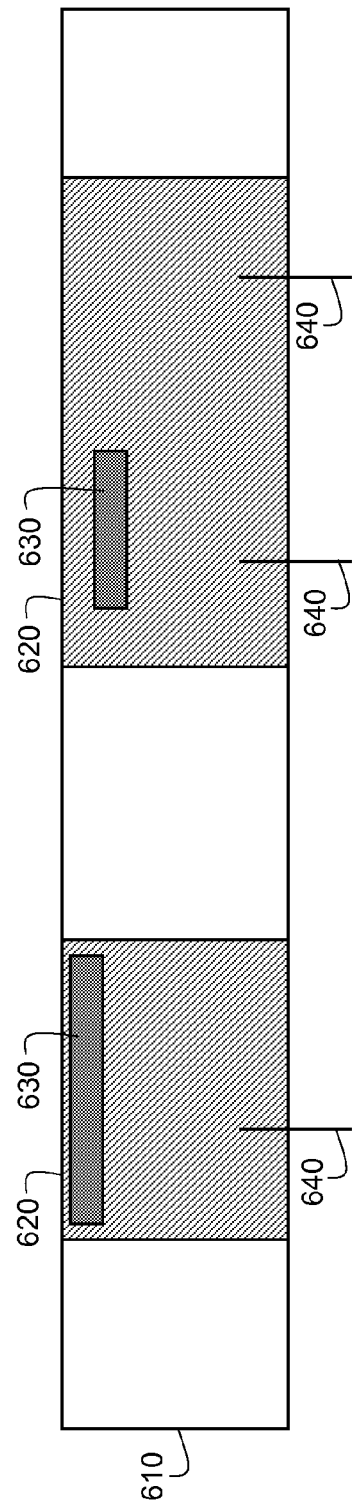
FIG. 15 illustrates the formation of key video snippets according to another embodiment.

FIG. 15 illustrates the formation of key video snippets 620 from the same digital video sequence 610 according to an alternate embodiment. In this case, the formation of the key video snippets 620 is further responsive to additional criteria. In this embodiment, the length of all key video snippets 620 are not required to be equal, and the location of each key video snippet 620 is not required to be centered around the corresponding highest-ranked key video frame 640. Furthermore, the start and end points of each key video snippet 620 are responsive to a criterion encouraging selection of start and end times corresponding to low levels of audio activity. Furthermore, the key video snippets 620 are formed responsive to a criteria that merges key video snippets that have corresponding highest-ranked key video frames 640 that are separated by a time interval less than a specified threshold. In this case, the first key video snippet 620 is lengthened and shifted off-center relative to the corresponding highest-ranked key video frame 640, so that the key video snippet 620 does not clip the speaking segment 630 at either end. Furthermore, the short time duration between the second and third highest-ranked key video frames 640 results in the merging of the corresponding key video snippets into a single key video snippet 620. The overall time duration constraint is enforced by adjusting the start and end times as necessary while still merging temporally close key video snippets 620 and avoiding clipped speaking segments 630. The key video snippets 620 shown in FIG. 15 generate a more pleasing video summary than the key video snippets 620 in FIG. 14.

The form video summary step 280 (FIG. 8) assembles the key video snippets 275 to form the video summary 285. In a preferred embodiment, the key video snippets are assembled in chronological order corresponding to their order of occurrence in the digital video sequence.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
27 accelerometer
28 firmware memory
30 image memory
32 image display
34 user controls
36 display memory
38 wired interface
40 computer
44 video interface
46 video display
48 interface/recharger
50 wireless modem
52 radio frequency band
58 wireless network
70 Internet
72 photo service provider
200 digital video sequence
210 analyze digital video step
215 importance value
220 form warped time representation step
225 warped time representation
230 subdivide warped time representation step
235 time intervals
240 select key video frames step
245 key video frames
250 store indication of key video frames step
260 determine highest-ranked key video frames step
265 highest-ranked key video frames
270 form key video snippets step
275 key video snippets
280 form video summary step
285 video summary
290 store video summary representation step
310 global motion information
320 local motion information
330 classifier
340 video frame classifications
400 digital video sequence
410 digital video intervals
420 time interval
500 warped time representation
510 warped digital video intervals
520 equal time interval
610 digital video sequence
620 key video snippet
630 speaking segments
640 highest-ranked key video frames
910 analyze digital video step
915 camera fixation pattern
920 rank key video frames step
925 motion trace
930 fixation location histogram
940 fixation location histogram

The invention claimed is:

1. A method for forming a video summary for a digital video having a time sequence of video frames, the method comprising:

determining, by a computing device, a set of video frames for the digital video;

ranking, by the computing device, the set of video frames;

forming, by the computing device, video snippets corresponding to one or more highest-ranked video frames according to a predefined set of criteria, wherein the predefined set of criteria comprises a criterion which specifies a total time duration for the video summary and a criterion which specifies a minimum time duration for each of the video snippets;

assembling, by the computing device, the video snippets to form the video summary;

storing, by the computing device, a representation of the video summary in a memory; and merging video snippets corresponding to highest-ranked video frames that are separated by time intervals less than a specified threshold to form a single video snippet.

2. The method of claim 1, wherein each highest-ranked video frame is included in a video snippet.

3. The method of claim 1, further comprising analyzing the digital video to determine an importance value as a function of time, wherein start and end times for at least one of the video snippets are determined responsive to a criterion which encourages inclusion of video frames having high importance values.

4. The method of claim 1, further comprising analyzing the digital video to determine a level of audio activity as a function of time, wherein start and end times for at least one of the video snippets are determined responsive to a criterion which encourages selecting start and end times corresponding to low levels of audio activity.

5. The method of claim 1, wherein the forming the video snippets comprises forming the video snippets according to a criterion which discourages the formation of video snippets that have similar content.

6. The method of claim 1, wherein the total time duration for the video summary is user-specified.

7. The method of claim 1, wherein the determining a set of video frames for the digital video comprises:
analyzing the digital video to determine an importance value as a function of time;
forming a warped time representation by temporal relocation of the video frames responsive to the importance value as a function of time;
subdividing the warped time representation into a set of equal intervals; and
selecting a video frame for each interval by analyzing the video frames within each interval.

8. The method of claim 1, wherein the ranking the video frames responsive to a predefined criterion comprises:
analyzing the digital video to determine a camera fixation pattern;
ranking the video frames responsive to the camera fixation pattern.

9. A digital video camera system comprising:
an image sensor;
an optical system configured to form an image of a scene onto the image sensor;
a data processing system; and
a memory system communicatively connected to the data processing system and storing instructions configured to cause the data processing system to implement a method for forming a video summary for a digital video, wherein the instructions comprise:
instructions to capture a digital video using the image sensor, the digital video having a time sequence of video frames;
instructions to determine a set of video frames for the digital video;
instructions to rank the video frames;
instructions to form video snippets corresponding to one or more highest-ranked video frames according to a predefined set of criteria, wherein the predefined set of criteria comprises a criterion which specifies a total time duration for a video summary and a criterion which specifies a minimum time duration for each of the video snippets;
instructions to assemble the video snippets to form the video summary;
instructions to store a representation of the video summary in a memory; and
instructions to merge video snippets corresponding to highest-ranked video frames that are separated by time intervals less than a specified threshold to form a single video snippet.

10. A method for forming a video summary for a digital video having a time sequence of video frames, the method comprising:
determining, by a computing device, a set of video frames for the digital video;
ranking, by the computing device, the video frames;
forming, by the computing device, video snippets corresponding to one or more highest-ranked video frames according to a predefined set of criteria, wherein the predefined set of criteria comprises a criterion which specifies a total time duration for the video summary and a criterion which specifies a minimum time duration for each of the video snippets, and wherein the forming video snippets comprises merging video snippets corresponding to highest-ranked video frames that are separated by time intervals less than a specified threshold to form a single video snippet;
assembling, by the computing device, the video snippets to form the video summary; and
storing, by the computing device, a representation of the video summary in a memory.

11. A method for forming a video summary for a digital video having a time sequence of video frames, the method comprising:
determining, by a computing device, a set of video frames for the digital video, wherein the determining comprises:
analyzing the digital video to determine an importance value as a function of time;
forming a warped time representation by temporal relocation of the set of video frames responsive to the importance value as a function of time;
subdividing the warped time representation into a set of equal intervals; and
selecting a video frame for each interval by analyzing the video frames within each interval;
ranking, by the computing device, the video frames;
forming, by the computing device, video snippets corresponding to one or more highest-ranked video frames according to a predefined set of criteria, wherein the predefined set of criteria comprises a criterion which specifies a total time duration for the video summary and a criterion which specifies a minimum time duration for each of the video snippets;
assembling, by the computing device, the video snippets to form the video summary; and
storing, by the computing device, a representation of the video summary in a memory.

12. The method of claim 1, wherein the video snippets are formed according to a criterion which favors starting a video snippet at a beginning of an encoding group of video frames and ending a video snippet at an end of the encoding group of video frames, wherein the encoding group of video frames includes an independently-encoded video frame and a plurality of predictive-encoded video frames.

13. The method of claim 1, further comprising classifying each video frame as a zoom video frame, a fast pan video frame, an inactive video frame, or an interesting video frame, wherein each of the zoom video frame, the fast pan video frame, or the interesting video frame have a different ranking value.

14. The method of claim 13, wherein the zoom video frame comprises a video frame where a camera is zooming in or out while the video frame is being captured, wherein the fast pan video frame comprises a video frame having a magnitude of global translational motion occurring that exceeds a threshold, wherein the inactive video frame comprises a video frame having a magnitude of global translational motion occurring that is below a threshold, and wherein the interesting video frame comprises all video frames not classified as the zoom video frame, the fast pan video frame, or the inactive video frame.

15. The digital video camera system of claim 9, wherein the memory system further stores instructions to merge video snippets corresponding to highest-ranked video frames that are separated by time intervals less than a specified threshold to form a single video snippet.

16. The digital video camera system of claim 9, wherein the instructions to determine a set of video frames for the digital video comprises:

instructions to analyze the digital video to determine an importance value as a function of time;

instructions to form a warped time representation by temporal relocation of the video frames responsive to the importance value as a function of time;

instructions to subdivide the warped time representation into a set of equal intervals; and instructions to select a video frame for each interval by analyzing the video frames within each interval.

* * * * *

UNITED STATES PATENT AND TRADEMARK OFFICE
CERTIFICATE OF CORRECTION

PATENT NO. : 8,605,221 B2
APPLICATION NO. : 12/786480
DATED : December 10, 2013
INVENTOR(S) : Deever Page 1 of 1

It is certified that error appears in the above-identified patent and that said Letters Patent is hereby corrected as shown below:

On the Title Page, item (51), under "Int. Cl.", in Column 1, Line 2,
delete "H04N 5/275 (2006.01)".

On Title Page 2, item (56), under "OTHER PUBLICATIONS", in Column 2,
Line 7, delete "Mudltimedia." and insert -- Multimedia. --, therefore.

Signed and Sealed this
Second Day of September, 2014

Michelle K. Lee
*Deputy Director of the United States Patent and Trademark Office*